United States Patent [19]

Ibuki

[11] 4,323,616

[45] Apr. 6, 1982

[54] REINFORCED VENEER SHEET AND THE METHOD OF MANUFACTURING THE REINFORCED VENEER SHEET

[75] Inventor: Yasuhiro Ibuki, Ohbu, Japan

[73] Assignee: Meinan Machinery Works, Inc., Aichi, Japan

[21] Appl. No.: 118,905

[22] Filed: Feb. 6, 1980

[51] Int. Cl.³ .......................... B32B 3/10; B27C 1/00; B27C 9/00

[52] U.S. Cl. .................................. 428/134; 144/2 R; 144/323; 428/131; 428/136

[58] Field of Search ....................... 428/131, 134, 136; 144/2 R, 323

[56] References Cited

U.S. PATENT DOCUMENTS

| | | | |
|---|---|---|---|
| 2,363,847 | 11/1944 | Dudas | 428/136 X |
| 3,911,978 | 10/1975 | Hurst | 144/2 R |
| 4,112,161 | 9/1978 | Sorrells | 428/131 X |
| 4,181,764 | 1/1980 | Totten | 428/136 X |

FOREIGN PATENT DOCUMENTS

| | | |
|---|---|---|
| 336498 | 1/1976 | Japan . |
| 51-1764 | 1/1976 | Japan . |
| 51-151311 | 12/1976 | Japan . |
| 53-18706 | 2/1978 | Japan . |

*Primary Examiner*—Thomas J. Herbert, Jr.
*Attorney, Agent, or Firm*—Brumbaugh, Graves, Donohue & Raymond

[57] ABSTRACT

A reinforced veneer sheet and a method of manufacturing the reinforced veneer sheet are provided. On an imperfect veneer sheet, a plurality of closed cuts are formed in a row through the sheet across the veneer grain. Through these closed cuts, a length of cord is forced at its intermediate portions from one side of the sheet until they protrude from the other side. The cuts are formed repeatedly and the cord is also forced through the cuts repeatedly on a veneer sheet fed in one direction or cut off from a log turned on a veneer lathe.

5 Claims, 15 Drawing Figures

FIG. 4
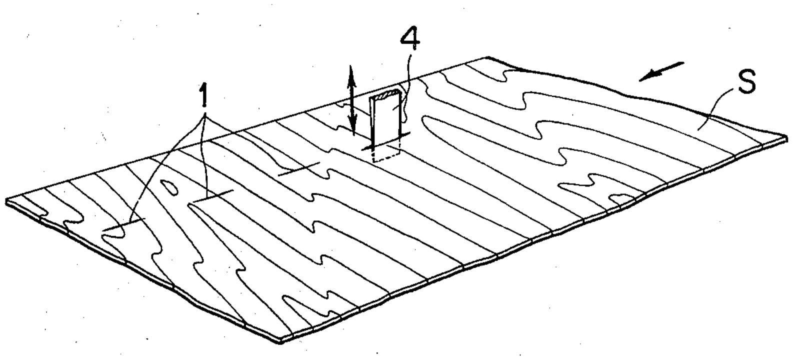
FIG. 5-a
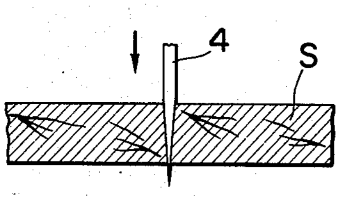
FIG. 5-b
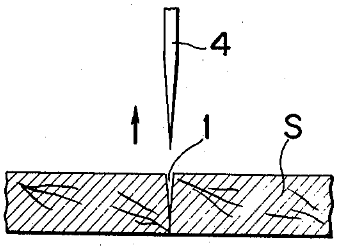
FIG. 6
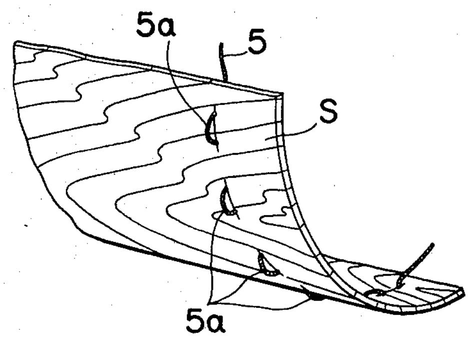

FIG. 7-a
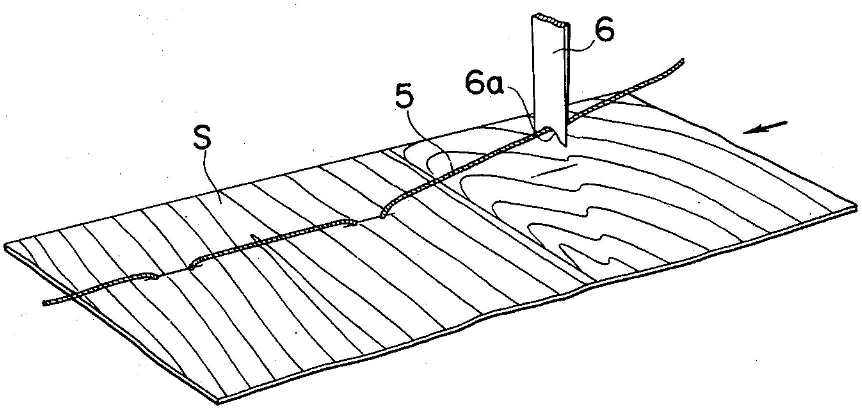
FIG. 7-b
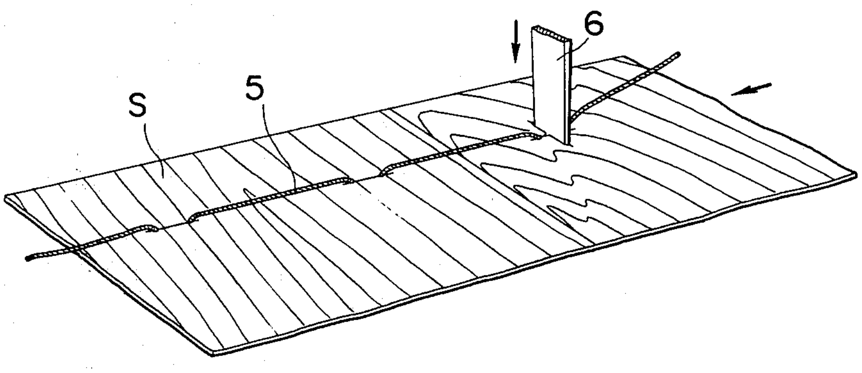

FIG. 7-c
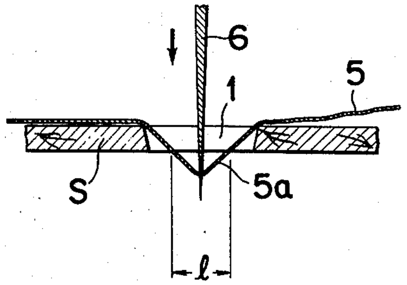
FIG. 7-d
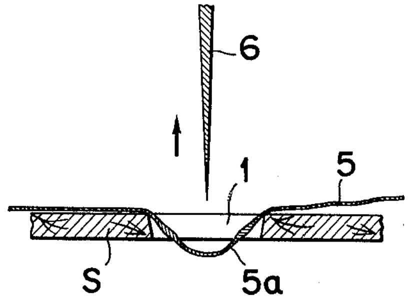
FIG. 8
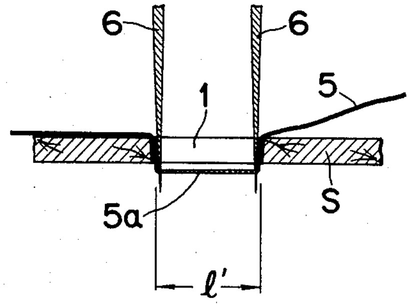
FIG. 9
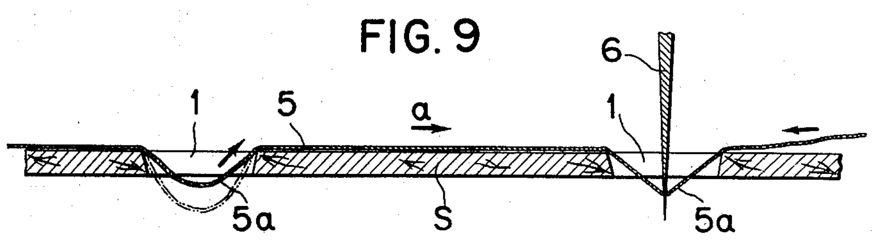

REINFORCED VENEER SHEET AND THE METHOD OF MANUFACTURING THE REINFORCED VENEER SHEET

BACKGROUND OF THE INVENTION

The present invention relates to a reinforced veneer sheet and a method of manufacturing the same placing a length of cord into embedding engagement with the veneer sheet by forcing the cord through cuts formed across the veneer grain with spacings therebetween.

In general, logs contain a number of cracks created by internal stress imbalance caused during the lumbering or drying steps. If such logs are subjected to a cutting operation on a veneer lathe, cut-off veneer sheets are frequently imperfect. Moreover, such sheets are so susceptible to external forces that they fragment due to development of the cracks or creation of new cracks during the subsequent processes including trimming and transporting.

Such veneer sheet fragments reduce the plywood quality and yield in plywood production.

In order to solve the above-mentioned problems, a number of proposals have been made. For example, the Japanese Patent Application Publication No. 51-1764 titled "A method of joining veneer sheets and apparatus therefor" discloses a technique of forming cuts into butt ends of the sheet and burying a length of cord into each cut to reinforce the veneer sheet. This method cannot apply to thin veneer sheets. The Japanese Patent Application Publication No. 33-6498 shows a method of forming straight wedge-formed cuts in the veneer surface and embedding a length of water or adhesive-impregnated cord therein. There is also proposed by the Japanese Patent Application Publication No. 51-151311 a method of joining wet veneer sheets by a length of cord that includes a step of forming streaks of slant cuts in the sheet for inbedding cords and by the Japanese Patent Application Provisional Publication No. 53-18706 wherein a joined veneer sheet is manufactured by the method of the Japanese Patent Application Publication No. 51-151311. However, these methods have drawbacks in that the formed cuts extend over a substantial distance, offsetting the reinforcing effect and ineffective adhesives are used.

SUMMARY OF THE INVENTION

To overcome the shortcomings of known prior art, the present invention provides in one aspect thereof a reinforced veneer sheet having at least one row of closed cuts formed with spacings therebetween through the sheet and across its grain; and a length of cord extending on one side of the veneer sheet and having intermediate portions forced through said closed cuts to protrude in part from the other side of the sheet, whereby said intermediate portions are clasped by the closed cuts.

In another aspect, there is further provided a method of manufacturing a reinforced veneer sheet comprising the steps of cutting through veneer sheet across the sheet's grain to form a series of closed cuts therein; laying a length of cord on one side of the sheet such that an intermediate portion of the cord is positioned on said cut; forcing said intermediate portion through the cut to protrude at the other side of the sheet; and repeating the foregoing steps.

In a further aspect, there is provided a method of manufacturing a reinforced veneer sheet comprising the steps of cutting into a log turned on a veneer lathe to a depth greater than a predetermined veneer thickness across the log's fiber extending along the log axis to form a closed cut therein; laying a length of cord on one side of a veneer sheet cut off from the log and having said closed cut therein such that an intermediate portion of the cord is positioned on said cut; forcing the cord intermediate portion through the cut to protrude at the other side of the sheet; and repeating the above steps.

BRIEF DESCRIPTION OF THE DRAWINGS

FIGS. 3 and 4 are perspective views of the present invention showing the steps of cutting into a veneer sheet;

FIGS. 5-*a* and 5-*b* are illustrations of the cutting step viewed across the veneer grain;

FIG. 6 illustrates the other side of the reinforced veneer sheet shown in FIG. 1;

FIGS. 7-*a* to 7-*d* show the cord forcing step in the present invention;

FIG. 8 is another mode of forcing the cord into the veneer sheet in the present invention;

FIG. 9 shows the way in which the cord forced through the sheet is made taut by the repetition of the cord forcing steps;

DETAILED DESCRIPTION OF THE PREFERRED EMBODIMENTS

Figure 1:
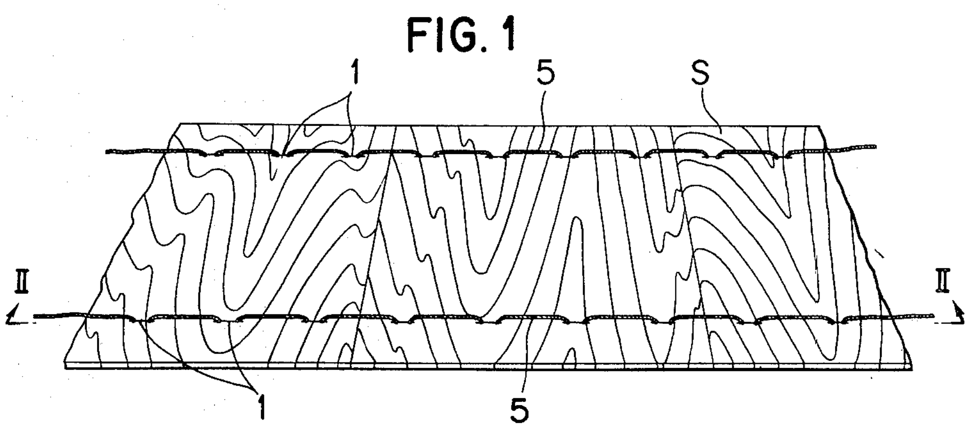
FIG. 1 is a perspective view of a veneer sheet manufactured by the method of the present invention.
Figure 2:
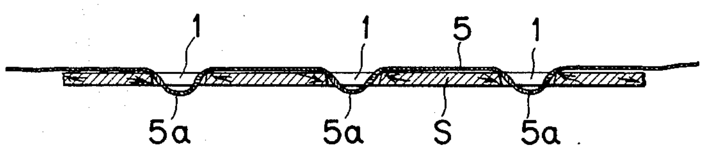
FIG. 2 is a cross section of the veneer sheet taken along the line II—II of FIG. 1.

Referring to FIG. 1, veneer sheet S cut off from a log on a veneer lathe (not shown) is reinforced by two lengths of cord 5 extending on one side of veneer sheet S and having their intermediate portions forced through a plurality of closed cuts 1 which extend across the veneer grain. Said cuts 1 are formed by cutting the veneer's fiber through the veneer thickness at a constant interval and in two rows extending across the veneer grain. As shown in FIG. 2, said cords 5 have their intermediate portions forced through closed cuts 1 such that portions 5*a* protrude from the other side of sheet S.

Figure 3:
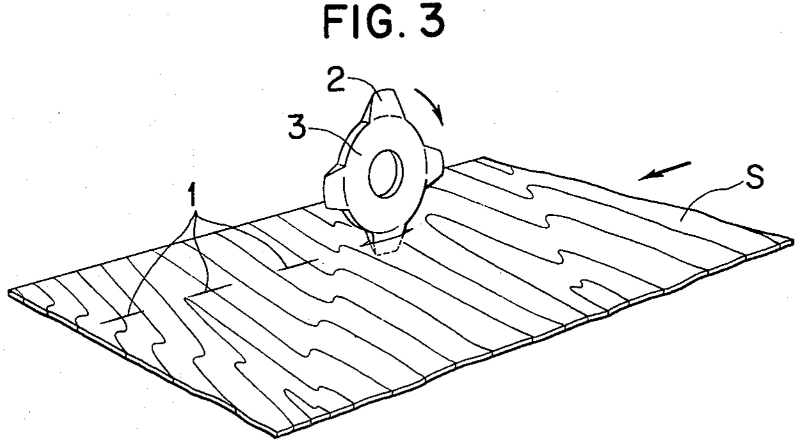

Referring to FIG. 3, cuts 1 are formed by feeding veneer sheet S in the arrow-marked direction, forcing one of the thin cutting blades 2 through veneer sheet S across the veneer grain, which blades are radially extending at a constant angular interval and carried on rotary support member 3, and rotating support member 3 in another arrow-marked direction at substantially the same speed as the veneer feeding speed by suitable drive means. Resultant cuts 1 are arranged across the veneer grain and at a constant interval in one row which is across the grain.

Otherwise, cuts 1 may be formed by orienting single thin cutting blade 4 across the veneer grain above veneer sheet S fed in an arrow-marked direction and vertically shuttling said blade regularly such that it is forced through sheet S and removed therefrom to form cuts 1 at a constant interval in a row extending across the veneer grain. The length of each cut 1 is 5 mm to 30 mm.

As shown in FIGS. 5-*a* and 5-*b*, thin cutting blade 4 is forced through the sheet S from one side thereof such that only the tip of its edge protrudes from the other side thereof and then removed therefrom to form cut 1. Since said cut 1 is formed across the veneer grain, it is readily closed due to a restoring action of veneer sheet S as soon as blade 4 is removed therefrom. It is preferable that said cuts 1 are formed in two rows or more across the veneer grain and near the veneer butt ends.

Intermediate portions of cord 5 of synthetic fiber, natural fiber, fiber of composite material thereof, or soft metal are forced through cuts in each row from one side of the sheet S such that portions 5*a* protrude in part from the other side thereof as shown in FIG. 6 to provide a reinforcing engagement in the veneer sheet due to a clasping action of closed cuts 1.

A compressible cord of twisted thread clasped by the closed cuts provides excellent engagement with the sheet since the diameters of portions 5*a* regain the original size while the clasped portions are flattened by cuts 1.

In order to increase the friction between cord 5 and veneer sheet S to prevent cord slip-off from cuts 1, cord 5 may be impregnated with resinous or rubber adhesives.

Referring to FIGS. 7-*a* to 7-*b*, a thickness of cord 5 is laid on one side of the sheet S such that intermediate portions thereof are positioned upon cuts 1 and then rigid member 6 having notch 6*a* at its lower end for engaging cord 5 therein is oriented along the veneer grain above closed cut 1 and moved downward to be forced through the sheet such that cord 5 is forced through closed cut 1 to protrude in part from the other side of sheet S. When rigid member 6 is removed, cord 5 remains in engagement with veneer sheet S.

Referring to FIGS. 7-*c* and 7-*d*, cord 5 is pressed at its one point through the sheet by one rigid member oriented across closed cut 1. Protruding portion 5*a* across a distance of l is made taut in a V-shaped manner and provides engagement with veneer sheet S when rigid member is removed from sheet S. However, as shown in FIG. 8, cord 5 may be pressed at two points through the sheet by two rigid members oriented across closed cut 1. In this case, protruding portion 5*a* across a distance of l' is made taut in a channel-shaped manner. This modification of cord forcing step is advantageous over that shown in FIGS. 7-*a* to 7-*b* in the following respects;

(1) Single rigid member 6 extending along the veneer grain inevitably breaks veneer wood when forcing cord 5 through veneer sheet S. In FIGS. 7*a* to 7*d*, such breakage can extend over the distance l. Two rigid members 6 shown in FIG. 8 also break the veneer fiber but if distance l' between the two rigid members is extended then protruding portion 5*a* of the cord can secure firmer engagement with the veneer.

(2) The two rigid members can protrude cord 5 of a sufficient length from cut 1 by forcing them through sheet S at a minimum depth, thus minimizing the veneer breakage.

A compressible cord can be easily forced through closed cuts with protruding portions 5*a* thereof providing sufficient engagement with the veneer sheet.

Referring to FIG. 9, protruding portions 5*a* which slacken after the forcing step as shown by dotted line are made taut by the repetition of the step since cord 5 is pulled by rigid member 6 in an arrow-marked direction a. A test result shows that the cut 1 in the wet veneer sheet closes so firmly that positive cord engagement with the veneer sheet is obtained.

Said rigid member 6 is vertically shuttled by appropriate means (not shown) is synchronism with the formation of cuts 1 such that cord 5 engaged in notch 6*a* is precisely forced through cuts 1 repeatedly.

Figure 10:
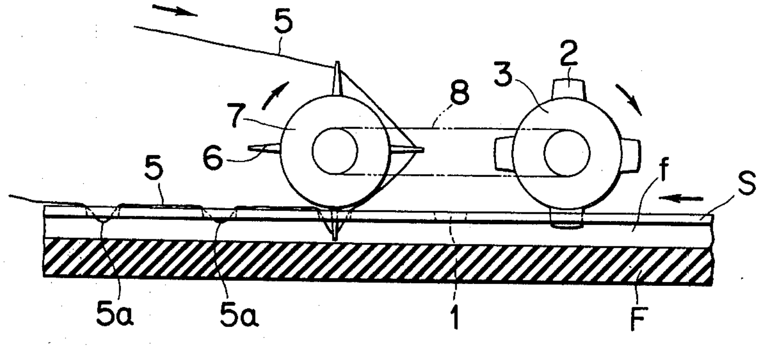
FIG. 10 is a side view of a device using one embodiment of the present invention.

Another embodiment of the present invention is illustrated in FIG. 10. Veneer sheet S is fed in an arrow-marked direction by suitable means F. Cuts 1 are formed at a constant interval in veneer sheet S across the veneer grain by rotary cutting means shown in FIG. 3. On the downstream side of said rotary cutting means, there is provided rotary cord forcing means including rotary support member 7, thin rigid members 6 radially carried on said rotary member 7 and having notch 6*a* at their tip as shown in FIG. 7-*a*. The diameters of both rotary means are designed to be equal and the angular spacing of rigid members 6 is equal to that of thin cutting blades 2 carried on rotary support member 3. Timing belt 8 is trained between axles of both rotary means so that both rotate at an equal speed to each other and in synchronism with the veneer feed. Cord forcing means is positioned on the sheet such that rigid member 6 is forced through the sheet from above cut 1 formed two pitches before. The veneer feeding means F also act as an anvil to support veneer S and has a groove to avoid interference with cutting blades 2 or rigid members 6. A length of cord 5 is paid out from above cord forcing means to be engaged through notch 6*a* of each rigid member 6. Thus, cord 5 is forced through cuts 1 repeatedly with the veneer feed and the rotation of both rotary means, thus providing a reinforced veneer sheet S.

Figure 11:
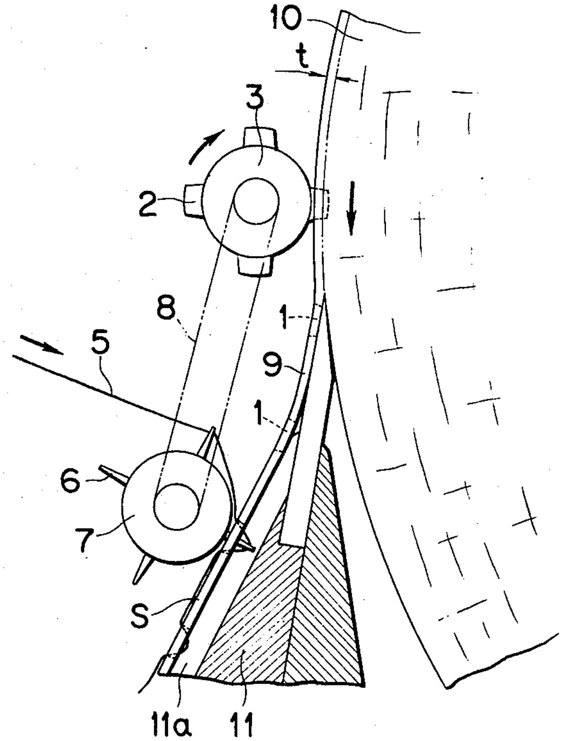
FIG. 11 is a side view of the device using another embodiment of the invention.

A further embodiment is illustrated in FIG. 11, in which a reinforced veneer sheet is cut off from a log 10 turned on a veneer lathe. A device for producing a reinforced veneer sheet is substantially the same as the embodiment shown in FIG. 10. However, rotary cutting means is positioned ahead of knife 9 such that thin cutting blade 2 cuts into the periphery of log 10 to a depth greater than predetermined veneer thickness t across the log's fiber extending along the log axis. The rotary cutting means is rotated by a suitable drive means at the same peripheral speed and in the same direction as log 10. Therefore, cutting blade 2 which cuts into the log periphery is removed therefrom with the rotation of rotary cutting means and the log to form closed cuts in succession in the log periphery. The rotary cord forcing means is positioned on the downstream side of knife 9. Knife 9 carries a veneer guide 11 thereupon to guide veneer sheet S cut off from the log. In association with said veneer guide 11, there is provided rotary cord forcing means to receive cut off veneer sheet S therebetween. The rotary cord forcing means is positioned such that thin rigid member 6 forces cord 5 through cut 1 formed three pitches before. Veneer guide 11 has groove 11*a* extending in the direction of veneer movement to receive rigid member 6 protruding from the sheet.

In the embodiments shown in FIGS. 10 and 11, the two rotary means may be made free running to follow the veneer or log movement and be separated with any spacings therebetween provided that rigid members 6 are adapted to force cord 5 through cuts 1 one by one. In all the embodiments shown in this specification, rows of cuts 1 are arranged across the veneer grain but they may be along the grain so long as cuts 1 are formed across the grain.

Unlike conventional methods which cut the veneer sheet along its grain, the present invention in which the veneer sheet is cut across the grain does not adversely effect the veneer strength since the cut will hardly develop after its creation.

Moreover, since the engagement of cord with a veneer sheet is maintained by the restoring action of veneer wood in closed cuts formed across the grain, greater reinforcing strength is obtained as compared to reinforcement by adhesive. This advantage is particularly noticiable when considering that the present invention eliminates the need for adhesives drying time.

When used on a veneer lathe, the present invention produces split free, reinforced easy-to-handle one-piece veneer sheets, which permits its winding onto a reel.

All these features contribute to increasing yield in plywood production.

What is claimed is:

1. A reinforced veneer sheet having at least one row of closed cuts, said closed cuts in each row having spaces therebetween, said closed cuts extending completely through said veneer sheet and across its grain; and a length of cord extending on one side of said veneer sheet and having intermediate portions forced through said spacially arranged closed cuts to protrude in part from the other side of said veneer sheet, said intermediate portions being clasped only by said spacially arranged closed cuts extending across said grain.

2. A reinforced veneer sheet according to claim 1, wherein said cord includes a compressible cord selected from the group consisting of a synthetic fiber cord, a natural fiber cord, and a cord of composite material thereof.

3. A reinforced veneer sheet according to claim 1, wherein said cord includes a soft metal material.

4. A reinforced veneer sheet according to claim 1, wherein said row is across the veneer grain.

5. A reinforced veneer sheet according to claim 1, wherein said spacings are at a regular interval.

* * * * *